United States Patent
Cristea et al.

(10) Patent No.: US 11,673,531 B2
(45) Date of Patent: Jun. 13, 2023

(54) EJECTOR ELEMENT FOR A BELT BUCKLE SENSOR WITH A TRIGGER, AND A BELT BUCKLE WITH SUCH AN EJECTOR ELEMENT

(71) Applicant: ILLINOIS TOOL WORKS INC., Glenview, IL (US)

(72) Inventors: Marian Cristea, Brasov (RO); Eyüp Aslan, Hannover (DE); Jose-Luis Serrada, Brunswick (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 3 days.

(21) Appl. No.: 17/227,595

(22) Filed: Apr. 12, 2021

(65) Prior Publication Data

US 2021/0316698 A1    Oct. 14, 2021

(30) Foreign Application Priority Data

Apr. 14, 2020    (DE) .................... 10 2020 110 204.6

(51) Int. Cl.
| | |
|---|---|
| *B60R 22/48* | (2006.01) |
| *A44B 11/25* | (2006.01) |
| *B29C 45/14* | (2006.01) |
| *B29L 31/00* | (2006.01) |

(52) U.S. Cl.
CPC .......... *B60R 22/48* (2013.01); *A44B 11/2546* (2013.01); *B29C 45/14467* (2013.01); *B29L 2031/727* (2013.01); *B60R 2022/4816* (2013.01)

(58) Field of Classification Search
CPC ............. B60R 2022/4816; B60R 22/48; B29L 2031/727; B29K 2503/06; B29K 2505/00; B29K 2995/0008; A44B 11/2546; B29C 45/14467; B29C 45/0001; B29C 45/14
See application file for complete search history.

(56) References Cited

U.S. PATENT DOCUMENTS

| | | | |
|---|---|---|---|
| 5,218,744 A | 6/1993 | Saito | |
| 5,742,986 A | 4/1998 | Corrion | |
| 6,076,239 A | 6/2000 | Kopetzky | |
| 6,851,713 B2 * | 2/2005 | Mattes | .................... B60R 22/48 280/801.1 |
| 6,868,745 B2 * | 3/2005 | Sullivan | ............ B60R 21/01546 73/862.391 |
| 6,889,408 B2 * | 5/2005 | Itoigawa | ................. B60R 22/48 24/303 |

(Continued)

FOREIGN PATENT DOCUMENTS

| | | |
|---|---|---|
| DE | 19715133 A1 | 10/1998 |
| DE | 102014112257 A1 | 3/2015 |
| EP | 0861763 | 9/1998 |

*Primary Examiner* — Robert Sandy
*Assistant Examiner* — Louis A Mercado
(74) *Attorney, Agent, or Firm* — Thompson Hine LLP

(57) ABSTRACT

An ejector element with a trigger for a belt buckle sensor includes a plate-shaped ejector body and a trigger blade of a magnetic and/or metallic material for producing a change in a magnetic field of a Hall sensor or an inductive sensor. The ejector element is distinguished by the fact that the trigger blade is connected in one piece to the ejector body, wherein the one-piece connection between the trigger blade and the ejector body is produced by an injection-molding process.

4 Claims, 1 Drawing Sheet

(56) References Cited

U.S. PATENT DOCUMENTS

| | | | | |
|---|---|---|---|---|
| 6,895,643 B2* | 5/2005 | Itoigawa | ................. | B60R 22/48 |
| | | | | 24/641 |
| 6,907,646 B2* | 6/2005 | Lee | ................... | B60R 21/01546 |
| | | | | 24/640 |
| 6,931,696 B2* | 8/2005 | Lee | ................... | B60R 21/01546 |
| | | | | 24/642 |
| 7,032,929 B2* | 4/2006 | Stanley | ................... | B60R 22/18 |
| | | | | 280/801.1 |
| 7,296,825 B1* | 11/2007 | Zia | ......................... | B60R 22/48 |
| | | | | 280/801.1 |
| 9,415,748 B2* | 8/2016 | Sugawara | ............... | B60R 22/48 |
| 9,555,769 B2* | 1/2017 | Lanter | ..................... | B60R 22/48 |
| 9,663,064 B2* | 5/2017 | Batenkow | .............. | H03K 17/97 |
| 10,470,528 B2* | 11/2019 | Jimenez Hernandez | ................... | |
| | | | | A44B 11/2573 |
| 10,618,496 B2* | 4/2020 | Roo | ......................... | H01H 9/04 |
| 2014/0266239 A1 | 9/2014 | Dewey | | |
| 2015/0082587 A1 | 3/2015 | Batenkow | | |

* cited by examiner

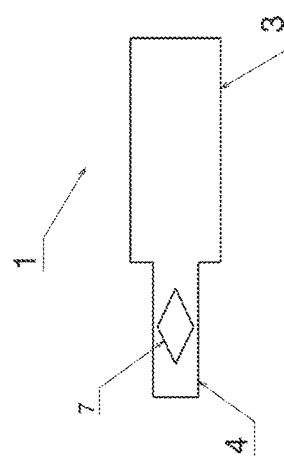
Fig. 1
Fig. 2
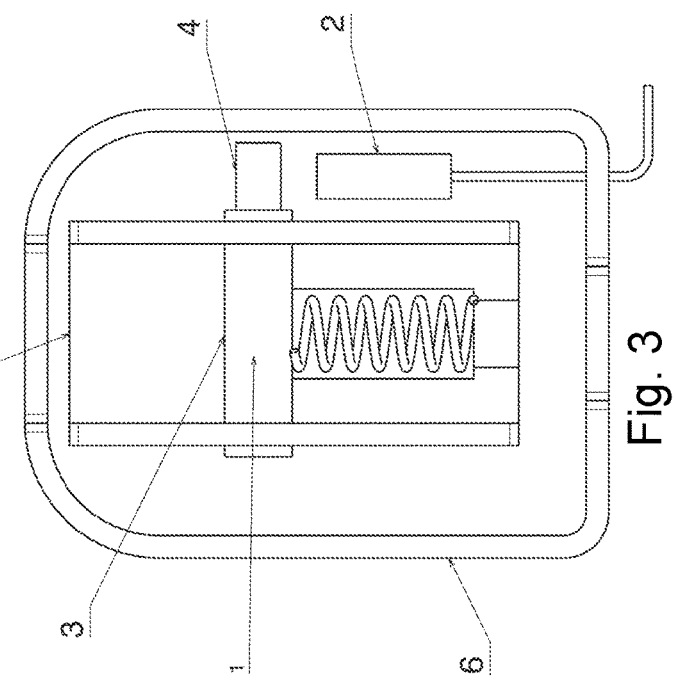
Fig. 3
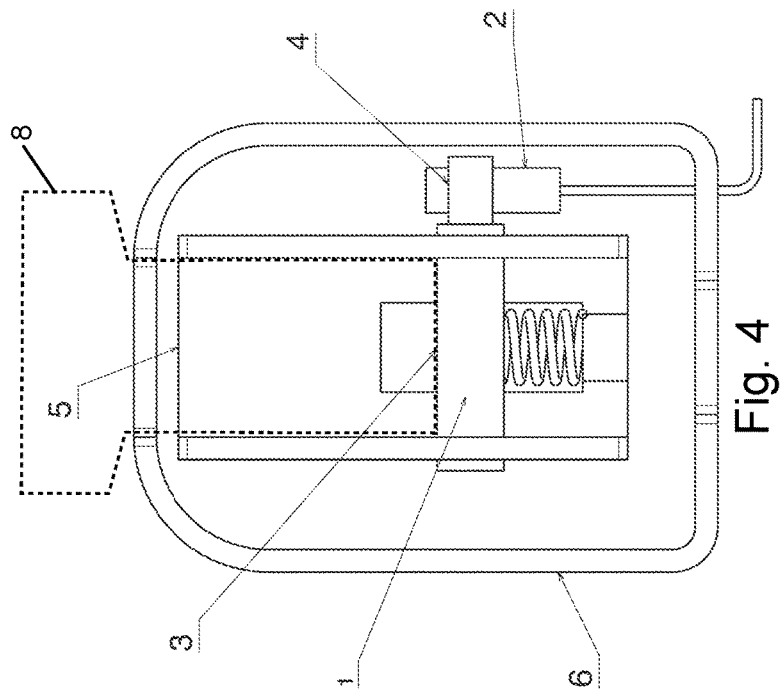
Fig. 4

EJECTOR ELEMENT FOR A BELT BUCKLE SENSOR WITH A TRIGGER, AND A BELT BUCKLE WITH SUCH AN EJECTOR ELEMENT

TECHNICAL FIELD

The present invention relates to an ejector element with a trigger for a belt buckle sensor, and to a belt buckle with such an ejector element.

BACKGROUND

Belt systems or restraining systems generally consist of a belt strap, a belt buckle, a belt retractor, a height adjusting means, a belt tensioner and the fitting parts such as buckle latch, deflection fitting and end fitting.

In order to put on the belt, the end piece of the belt provided therefor, the buckle latch, is introduced into the belt buckle and latched therein. This operation is also referred to as "fastening one's seatbelt". A button on the housing of the belt buckle is usually used to open the belt.

In modern motor vehicles, a sensor is installed in the belt buckle and, together with a sensor in the seat, determines whether someone is occupying the seat and whether that person has fastened their seatbelt. A "fasten seatbelt reminder" is implemented as a flashing indicator light in the electronic instrument cluster and as an audible warning tone.

Belt buckles are thus used in particular in vehicles in conjunction with safety belts. In automobiles, said belt buckles are usually fixedly attached between the seats and the center console or fastened to short belt ends on the rear seat. In the case of seats in aircraft, said belt buckles are usually located in the middle of the two belt halves and can be opened by folding up a part.

In the case of restraining systems in motor vehicles, for safe and reliable operation of safety devices, such as front, knee, side and/or head airbags, it is necessary to ensure that a restraining system provided in the vehicle is also used by a passenger, and also that said system is locked properly when in use.

Otherwise, the safety devices, in particular airbag devices, could even lead to injuries of the respective occupant in the case of a collision.

In order to ensure this, the locking state of a belt buckle latch, which is inserted into a belt buckle, of a safety belt is detected. On the basis of the locking state of the belt buckle, signals can be generated in order to draw the passengers' attention, by way of a signal, to put on and close the safety belts. Since the introduction of airbag devices, the information about the locking state of the safety belt systems has also been taken into account in the actuation of said airbag devices.

A detection device for detecting the belt buckle latch is arranged in the belt buckle and is required by law. Said detection device is used to determine whether or not the passenger has locked their safety belt properly. When the safety belt is not in use, a corresponding warning is output in the region of the instrument panel, together with an audible warning.

A plurality of technologies for latch detection are commercially available, for example by means of a Hall sensor.

Hall sensors consist of very thin crystalline doped semiconductor layers which generally have four electrodes to the side. A current is fed in by the two opposite electrodes, and the two electrodes lying orthogonal thereto are used for tapping off the Hall voltage. If such a Hall sensor is permeated by a magnetic field running perpendicular to the layer, said sensor supplies an output voltage which is proportional to the (signed) magnitude of the vector product of magnetic flux density and current. The cause is the Lorentz force on the moving majority charge carriers in the layer. It is proportional to the current and to the charge carrier mobility and inversely proportional to the layer thickness (the thinner the layer, the greater the charge carrier velocity and the greater the Lorentz force). The electric field produced between the measurement electrodes is in equilibrium with the Hall voltage and prevents a further charge carrier separation.

In addition, the Hall voltage is also temperature-dependent and may have an offset. On account of the proportionality of the Hall voltage to the charge carrier mobility and the concentration of the majority charge carriers, the Hall effect is an established method for determining these characteristics in semiconductor technology.

A Hall sensor also supplies a signal if the magnetic field in which it is located is constant. This is the advantage compared with a single coil as magnetic field sensor (for example induction loop, Rogowski coil), which can only determine the derivation of the magnetic field over time. A further important advantage of Hall sensors is that no ferromagnetic or ferrimagnetic materials (such as for example nickel or iron) are required for their implementation. Thus, the magnetic field to be measured is not already changed by introduction of the sensor.

EP-A-0 861 763 discloses a belt buckle with an integrated preloaded Hall sensor, which senses in a contactless manner the state of a locking body or of an ejector for a buckle latch which is introduced into the belt buckle. In this case, a Hall sensor with a Hall field is arranged in direct proximity to a permanent magnet. The magnetic field of the permanent magnet is changed as a result of a change in position of the locking body or of the ejector, which are both composed of a ferromagnetic material. As a result, there is also a change in the signal of the Hall sensor, with the result that the state change can be tapped off as a voltage change at the output of the Hall sensor. In an alternative embodiment variant, it is proposed for the Hall sensor with a Hall field to be installed without a permanent magnet and, for this purpose, for the locking body or the ejector to be con-figured as a permanent magnet. In this arrangement, it is also intended for the change in position of the locking body or of the ejector to be able to be sensed by a change in the Hall voltage.

DE 10 2014 112 257 A1 describes a belt buckle with a Hall sensor for sensing the locking state of the belt buckle, which has a metallic belt buckle frame arranged in a belt buckle housing. The belt buckle frame has an upper part and an associated lower part, which are connected to one another in such a way that they delimit a slot-like guide channel for an inserted belt latch. A spring-loaded locking device for the inserted belt latch is mounted on the belt buckle frame. A spring-loaded ejector for the inserted belt latch is arranged in the guide channel, said ejector being displaceable in a translational manner from a first end position into a second end position and being coupled to the locking mechanism. A Hall sensor, which is arranged inside the belt buckle, is used to detect the locking state of the belt buckle. The Hall sensor interacts with a permanent-magnet component whose distance relative to the Hall sensor is variable in dependence on the translational displacement of the ejector during the actuation of the locking mechanism.

The Hall sensor is arranged on or in the metallic belt buckle frame and is covered by a metallic shield element which extends substantially parallel to the belt buckle frame and which has a flux concentrator for the magnetic field generated by the permanent-magnet component and acting on the Hall sensor.

In order to trigger the Hall sensor, for example a metal blade or a magnet is provided as a trigger. Both solutions necessitate a mechanical connection of the trigger to the ejector.

In the case of a metal blade which interacts with the Hall sensor, provision can be made for the metal blade to be connected to the ejector by means of a rivet connection. When the belt buckle latch is introduced, the ejector is moved in the direction of the Hall sensor, the metal blade interacts with the magnetic field present and an IN signal is generated. When the latch is ejected, the ejector moves away from the Hall sensor, and an OUT signal is generated.

In the case of an ejector which interacts with a magnet located in the Hall sensor, provision can be made for a magnet to be arranged in the housing of the Hall sensor. When the latch is introduced, the ejector is moved in the direction of the Hall sensor, engages the magnet and displaces it into the vicinity of the Hall sensor. The magnet interacts with the magnetic field present and an IN signal is provided. When the latch is ejected, the ejector, and thus the magnet, moves away from the Hall sensor, and the OUT signal is provided.

In addition to rivet connections, further known possibilities for connecting the ejector and the trigger are interference fits and adhesive bonds. However, the production thereof is relatively elaborate.

SUMMARY

It is therefore an object of the present invention to provide an ejector element with a trigger for a belt buckle sensor, and also a belt buckle with such an ejector element, which can be produced in a simple manner, in order to save time and costs in the production process.

A further object of the present invention consists in providing an ejector element with a trigger for a belt buckle sensor, and also a belt buckle with such an ejector element, which is safe and reliable during operation.

According to the invention, an ejector element with a trigger for a belt buckle sensor is provided. This element comprises a plate-shaped ejector body and a trigger blade of a magnetic and/or metallic material for producing a change in a magnetic field of a Hall sensor or an inductive sensor. The ejector element is distinguished by the fact that the trigger blade is connected in one piece to the ejector body, wherein the one-piece connection between the trigger blade and the ejector body is produced by an injection-molding process.

In the context of the present invention, a one-piece or integral connection is understood to mean materially integral or cohesive connections, in which the connection partners are held together by atomic or molecular forces and which are produced by an injection-molding process. This is thus a non-releasable connection which can only be destructively separated. Other cohesive connections such as for example soldering, welding, adhesive bonding and vulcanizing are not referred to as one-piece connections in the context of the present invention.

As a result of the fact that the trigger blade is connected in one piece to the ejector body, and the one-piece connection between the trigger blade and the ejector body is produced by an injection-molding process, it is possible for the trigger element to be produced in a single work step.

As a result of the one-piece connection produced in the injection-molding process, the trigger blade and the ejector body are connected to one another safely and reliably, since an additional work step in which it is necessary to connect the trigger blade and the ejector body to one another for example by means of an interference fit or an adhesive bond or a rivet connection can be dispensed with.

In addition, the ejector element can be produced in a more cost-effective manner.

The trigger blade can be formed from a magnetic and/or metallic plastic, in particular a metallic polymer, and the ejector body is formed from a plastic and wherein the one-piece connection between the trigger blade and the ejector body is produced by a multi-component injection-molding process.

According to the present invention, the multi-component injection molding is used to produce the ejector element, in particular the connection between the ejector body and the trigger blade, in one work step, wherein the trigger blade can be formed from a magnetic and/or metallic polymer/plastic and the ejector body is formed from a plastic, such as, for example, polyamide (PA), preferably polyoxymethylene (POM), wherein the two components are formed, or connected to one another, in an integral or one-piece manner.

Furthermore, the trigger blade can have a magnetic and/or metallic element, wherein the ejector element is produced by encapsulating the magnetic and/or metallic element with a plastic, so that the trigger blade and the ejector body are produced in one piece by an injection-molding process.

The ejector element, that is to say the trigger blade and the ejector element can then both be formed from POM.

Furthermore, according to the invention, a belt buckle for a safety belt or for a restraining system is provided. This belt buckle comprises a Hall sensor or an inductive sensor for sensing a locking state of the belt buckle, and an ejector element that can be displaced by a belt latch and that is configured according to the preceding embodiments for changing the magnetic field of the Hall sensor or the inductive sensor for sensing a locking state of the belt buckle.

Such a Hall sensor is configured for contactless determination of a locking state of a belt buckle. The belt buckle can assume two positions. In a first position, the belt latch of a safety belt is not inserted in the belt buckle and/or not locked therein. In a second state, the belt latch is received and locked in the belt buckle. The Hall sensor consists, in principle, of a semiconductor layer which is supplied with a constant current, typically in an integrated design. A magnetic field component perpendicular to the semiconductor layer influences the constant current and the sensor supplies an evaluable Hall voltage, which can be tapped off and used for evaluation of a state or else used directly as a switching voltage. The integrated design of Hall sensors affords the possibility of already integrating an evaluation circuit, which is suitable for evaluating the switching state, on the hall sensor.

An inductive proximity switch primarily consists of three functional units: an oscillator, an evaluation unit and an output stage. As soon as a feed voltage is applied to the inductive proximity switch, the oscillator begins to oscillate.

The resulting electromagnetic field is directed forward to the active area by means of a ferrite core (half pot-core), in which the coil of the oscillating circuit of the oscillator is located. An approaching object or else an actuating element draws energy from the oscillating circuit, whereupon the oscillator voltage becomes lower.

The downstream comparator detects this and actuates the output switching amplifier for the set switching distance or oscillation level.

According to the invention, a method for producing an ejector element with a trigger for a belt buckle sensor is also provided. The method comprises the following steps:

injecting a magnetic and/or metallic polymer/plastic, forming a trigger blade, into a cavity of a multi-component injection-molding machine, injecting a further plastic, forming an ejector body, into the cavity, so that a one-piece connection between the trigger blade and the ejector body is produced by a multi-component injection-molding process, wherein injecting the magnetic and/or metallic polymer/plastic forming the trigger blade and the plastic forming the ejector body into the cavity one after the other according to a "multi-component injection molding or sandwich process", wherein first the magnetic and/or metallic polymer/plastic forming a trigger blade is injected into the cavity and then the plastic forming the ejector body is injected into the cavity, or vice versa, or wherein the magnetic and/or metallic polymer/plastic forming the trigger blade and the plastic forming the ejector body are injected into the cavity simultaneously, so that the ejector element is produced according to a co-injection process.

The advantages described above on the basis of the ejector element apply analogously for the corresponding methods according to the invention.

There are various multi-component injection-molding processes, of which the following are suitable for producing the ejector element according to the invention. A factor common to all of these processes is that injection-molding machines having two or more injection units but only one closing unit are required. The parts can thus be produced cost-effectively in one operation by means of only one tool. The injection units have to operate harmoniously but must always be controllable independently of one another. The components can be injected by way of a single special nozzle or introduced at different points into the tool.

In the case of multi-component injection molding, different materials are processed in one part.

In the case of co-injection, in contrast to a sandwich process as above, the components are not injected one after another but rather are injected into the same cavity simultaneously.

According to the invention, a method for producing an ejector element with a trigger for a belt buckle sensor is also provided, comprising the following steps:

placing a magnetic and/or metallic element for the trigger blade into a cavity of an injection-molding machine, injecting a plastic into the cavity, so that the trigger blade and the ejector body are produced by an injection-molding process.

BRIEF DESCRIPTION OF THE DRAWINGS

The present invention is described in more detail below on the basis of the exemplary embodiments. In the drawings:

FIG. 1 shows a schematic illustration of an ejector element according to the invention according to a first exemplary embodiment, FIG. 2 shows a schematic illustration of an ejector element according to the invention according to a second exemplary embodiment, FIG. 3 shows a schematic perspective illustration of a belt buckle with an ejector element according to the invention in a state in which no belt latch is arranged in the belt buckle, and FIG. 4 shows the illustration from FIG. 3, wherein a belt latch is arranged and locked in the belt buckle.

An ejector element 1 for a belt buckle sensor 2 comprises a plate-shaped ejector body 3 and a trigger blade 4 (FIGS. 1 to 4).

DETAILED DESCRIPTION

According to a first exemplary embodiment, the trigger blade 4 is formed from a magnetic and/or metallic material for producing a change in a magnetic field of a Hall sensor or an inductive sensor (FIG. 1).

The trigger blade 4 and the ejector body 3 are connected in one piece to one another.

The ejector body 3 is formed from a plastic, preferably polyoxymethylene (POM).

The ejector body 3 is configured to be approximately rectangular and plate-shaped in such a way that it can be arranged in a belt latch guide 5 of a belt buckle 6 and can be displaced in, and counter to, an insertion direction 8 by means of a belt latch.

The trigger blade 4 is configured to be approximately rectangular and plate-shaped and is provided in order to trigger a signal in a belt buckle sensor. The belt buckle sensor 2 is preferably configured as a Hall sensor.

In this case, provision is made for a current flowing through the Hall sensor 2 to generate a magnetic field. A Hall voltage resulting therefrom is approximately zero volts.

As soon as the trigger blade 4 is displaced by way of the actuation by means of a belt latch 8 (shown in dashed line) in the region of the magnetic field of the Hall sensor 2, the magnetic field changes and a corresponding Hall voltage is non-zero.

This signal can be detected and thus makes it possible to determine the locking state of a belt buckle 6.

The one-piece connection between the trigger blade 4 and the ejector body 3 is produced by a multi-component injection-molding process.

According to a method according to the invention for producing an ejector element 1, in particular according to a first exemplary embodiment, for a belt buckle sensor 2, the following steps are provided.

Injecting a magnetic and/or metallic polymer, forming the trigger blade 4, into a cavity 9 (shown in dashed line) of a multi-component injection-molding machine.

Injecting a further plastic, forming the ejector body 3, into the cavity, so that a one-piece connection between the trigger blade 4 and the ejector body 3 is produced by a multi-component injection-molding process.

The magnetic and/or metallic polymer forming the trigger blade 4 and the plastic forming the ejector body 3 are injected into the cavity one after the other according to a multi-component injection molding or sandwich process, wherein first the magnetic and/or metallic polymer forming the trigger blade 4 is injected into the cavity and then the plastic forming the ejector body 3 is injected into the cavity, or vice versa.

As an alternative, provision can also be made for the magnetic and/or metallic polymer forming the trigger blade 4 and the plastic forming the ejector body 3 to be injected into the cavity simultaneously, so that the ejector element 1 is produced according to a co-injection process.

In the following text, an ejector element 1 according to the invention is described according to a second exemplary embodiment (FIG. 2). Unless otherwise described, this ejector element 1 comprises the same technical features as the ejector element 1 according to the first exemplary embodiment. Identical components are provided with the same reference designations.

The trigger blade 4 has a magnetic and/or metallic element 7, wherein the ejector element 1 is produced by encapsulating the magnetic and/or metallic element 7 with a plastic, so that the trigger blade 4 and the ejector body 3 are produced in one piece by an injection-molding process.

According to a corresponding method for producing such an ejector element 1, the following steps are provided.

Placing the magnetic and/or metallic element 7 for the trigger blade 4 into a cavity of an injection-molding machine.

Injecting a plastic into the cavity, so that the trigger blade 4 and the ejector body 3 are produced by an injection-molding process.

Here, provision is made for the plastic to completely or virtually completely enclose the metallic element 7. Accordingly, here, the magnetic and/or metallic element 7 is encapsulated in order to form the trigger blade 4.

Furthermore, according to the invention, a belt buckle with an ejector element 1 according to the invention is provided.

A corresponding belt buckle is configured similarly to the belt buckle described in DE 10 2014 112 257 A1.

LIST OF REFERENCE DESIGNATIONS

1 Ejector element
2 Belt buckle sensor
3 Ejector body
4 Trigger blade
5 Belt latch guide
6 Belt buckle
7 Element

What is claimed is:

1. An ejector element with a trigger for a belt buckle sensor comprising
   a plate-shaped ejector body and
   a trigger blade of a magnetic and/or metallic material for producing a change in a magnetic field of a Hall sensor or an inductive sensor,
   wherein the trigger blade is connected in one piece to the ejector body, and wherein the one-piece connection between the trigger blade and the ejector body is produced by a multi-component injection-molding process;
   wherein an entirety of the trigger blade is formed from a first plastic that is a magnetic and/or metallic polymer/plastic and the ejector body is formed from a further plastic, wherein the trigger blade and the ejector body are a common molded structure such that the one-piece connection between the trigger blade and the ejector body is a molded connection between the first plastic and the further plastic.

2. The ejector element as claimed in claim 1,
   wherein the ejector body is formed from polyoxymethylene.

3. A belt buckle including the ejector element of claim 1 and further comprising
   a Hall sensor or an inductive sensor for sensing a locking state of the belt buckle,
   wherein the ejector element is displaceable by a belt latch for changing the magnetic field of the Hall sensor or the inductive sensor for sensing a locking state of the belt buckle.

4. A method for producing an ejector element with a trigger for a belt buckle sensor, comprising the following steps
   injecting a magnetic and/or metallic polymer/plastic, forming a trigger blade, into a cavity of a multi-component injection-molding machine,
   injecting a further plastic, forming an ejector body, into the cavity, so that a one-piece connection between the trigger blade and the ejector body is produced by a multi-component injection-molding process, wherein:
   the magnetic and/or metallic polymer/plastic forming the trigger blade and the further plastic forming the ejector body are injected into the cavity one after the other according to a multi-component injection molding or sandwich process, wherein first the magnetic and/or metallic polymer/plastic forming the trigger blade-is injected into the cavity and then the further plastic forming the ejector body is injected into the cavity, or vice versa, or
   the magnetic and/or metallic polymer/plastic forming the trigger blade and the further plastic forming the ejector body are injected into the cavity simultaneously, so that the ejector element is produced according to a co-injection process.

* * * * *